United States Patent
Wang et al.

(10) Patent No.: US 8,641,091 B2
(45) Date of Patent: Feb. 4, 2014

(54) HYBRID INFLATOR OF AIRBAG

(71) Applicant: Mosa Industrial Corporation, Yunlin (TW)

(72) Inventors: Teh-Hsin Wang, Taichung (TW);
Long-Ming Tsai, Taipei (TW);
Chia-Jung Lin, Taichung (TW);
Yun-Hsien Lin, Taichung (TW)

(73) Assignee: Mosa Industrial Corporation, Huwei, Yunlin (TW)

( * ) Notice: Subject to any disclaimer, the term of this patent is extended or adjusted under 35 U.S.C. 154(b) by 0 days.

(21) Appl. No.: 13/686,638

(22) Filed: Nov. 27, 2012

(65) Prior Publication Data
US 2013/0133544 A1    May 30, 2013

(30) Foreign Application Priority Data

Nov. 28, 2011  (TW) .............................. 100143620 A (51) Int. Cl.
*B60R 21/26* (2011.01)
(52) U.S. Cl.
USPC ........................... 280/741; 280/736; 280/737
(58) Field of Classification Search
USPC .......................................... 280/736, 737, 741
See application file for complete search history.

(56) References Cited

U.S. PATENT DOCUMENTS

| | | | | |
|---|---|---|---|---|
| 5,564,741 | A * | 10/1996 | Ward et al. | 280/740 |
| 5,660,412 | A * | 8/1997 | Renfroe et al. | 280/737 |
| 5,851,027 | A * | 12/1998 | DiGiacomo et al. | 280/736 |
| 6,199,906 | B1 * | 3/2001 | Trevillyan et al. | 280/741 |
| 7,059,633 | B2 * | 6/2006 | Wang et al. | 280/737 |
| 7,527,289 | B2 * | 5/2009 | Numoto et al. | 280/736 |
| 8,191,927 | B2 * | 6/2012 | Jordan et al. | 280/741 |
| 2003/0145921 | A1 * | 8/2003 | Blomquist et al. | 149/19.2 |
| 2003/0146611 | A1 * | 8/2003 | Kenney et al. | 280/736 |

* cited by examiner

*Primary Examiner* — Toan To
(74) *Attorney, Agent, or Firm* — Muncy, Geissler, Olds & Lowe, PLLC (57) ABSTRACT

The present invention discloses a hybrid inflator of an airbag. The hybrid inflator of the airbag includes a main casing, a central channel, a vent tube, a rupture disc, an inner cover group, an igniter group, a first buffering pad, a second buffering pad and a diffuser. The main casing includes a bottom housing and an upper housing. The central channel is fixed with the bottom housing and passed through the upper housing. A convective hole is disposed on the central channel. The vent tube is covered onto the external central channel and has a throttle bore thereon. The first buffering pad is disposed on a bottom of the inter air chamber. The second buffering pad is disposed in the inner air chamber to separate a space for propellant. The diffuser is correspondingly covered and fixed on the main casing.

12 Claims, 7 Drawing Sheets

HYBRID INFLATOR OF AIRBAG

CROSS-REFERENCE TO RELATED APPLICATION

This application claims the benefit of Taiwan Patent Application No. 100143620, filed on Nov. 28, 2011, in the Taiwan Intellectual Property Office, the disclosure of which is incorporated herein in its entirety by reference.

FIELD OF THE INVENTION

The present invention relates to a hybrid inflator of an automobile airbag, in particular to the pressurized gas and pyrotechnic hybrid inflator used for inflating airbags on both driver's side and passenger's side.

BACKGROUND OF THE INVENTION

Supplement Inflatable Restraint System (SRS) also known as safety airbag is a standard equipment for automobiles, which is provided for protecting passengers or drivers in case of a car accident, and the SRS is capable of inflating an airbag quickly (approximately 0.1 second) to provide a buffering space for protecting passengers from being hit or injured in the car accident.

There are three main methods of inflating the automobile airbags as described below. 1. A full high-pressure air inflator uses a pressurized gas stored in an air cylinder as a gas source for inflating the airbag, and such inflator has the drawbacks of requiring a relatively larger gas storage and pressure, and thus causing greater volume, thickness and weight of the air cylinder and incurring a higher cost and more limitation on its application.

2. A pyrotechnic inflator fills propellant therein, such that when the propellant in the inflator is struck, the igniter will ignite the propellant to produce gas and fill up an airbag. However, such inflator has the drawback of producing a high temperature gas which may damage the airbag easily or burn or injure the passengers, and the solid residue and toxic gases remained after the combustion jeopardize our health and environment.

3. A hybrid inflator improves over the drawbacks of the aforementioned two types of inflators, wherein propellant is ignited to produce high-pressure gas mixed with a room-temperature pressurized gas in an air cylinder, so as to achieve the effects of the aforementioned two types of inflators, preventing accidents caused by the too-high temperature, and providing an easier installation due to the smaller and lighter air cylinder. In addition, the air cylinder with a lower pressure may reduce the cost effectively.

However, such hybrid inflator is limited by the amount of propellants and the sealing degree and technology of the pressurized gas cylinder. Many factors must be taken into consideration to produce airflow with sufficient pressure while having the capability of releasing the mixed high pressure gas appropriately if the seal plate at the mouth of the air cylinder cracks and assuring the sufficient airtightness and safety at normal use of the air cylinder in order to achieve the most appropriate and safety conditions. The conventional inflator generally comes with a structure that may not be disposed a narrow space easily, and thus is lack of practicability. Based on the foregoing reasons, the inventor of the present invention designed a hybrid inflator of an airbag, in hope of overcoming the drawbacks of the prior art and improving the industrial application.

SUMMARY OF THE INVENTION

In view of the shortcomings of the prior art, the inventor of the present invention based on years of experience in the related industry to conduct researches and experiments, and finally invented a hybrid inflator of an airbag to overcome the drawbacks of the prior art.

To achieve the aforementioned objective, the present invention provides a hybrid inflator of an airbag, comprising: a main casing, including a bottom housing and an upper housing, and the bottom housing having an ignition hole formed on a bottom wall of the bottom housing, and the upper housing being correspondingly fixed at the top of the bottom housing and the upper housing together with the bottom housing forming a complete sealed casing, and a through opening penetrated through a top end wall of the upper housing; a central channel, having a pipe member with a hollow therein and an opening formed at an upper end of the pipe member, and the bottom of the pipe member being correspondingly fixed onto the bottom housing, and upper end of the pipe member correspondingly passing through the through opening for fixing the upper housing, and a plurality of convective holes being formed on a wall of the central channel; a vent tube, correspondingly sheathed on an external side of the central channel, and having an aluminum foil sticker attached onto an external surface of the vent tube, and a plurality of throttle holes penetrating through the vent tube; a rupture disc, correspondingly sealed and disposed at an upper end of the central channel for preventing a gas outflow from the main casing, and openable from an inner side by a pushing force of a certain degree; an inner cover group, including a cushion ring, a cup cover and a support plate, and the cushion ring being correspondingly disposed on an internal circular wall of the bottom housing, and the cup cover having a shape corresponding to the shape of the cushion ring and covered and fixed to the top of the cushion ring and the cup cover and the bottom housing being enclosed into an inner air chamber, and a propellant being disposed in the inner air chamber, and a sheath opening penetrated through the cup cover and correspondingly sheathed on the central channel; an igniter group, correspondingly fixed to the ignition hole corresponding to the inner air chamber, for producing an ignition airflow after receiving an ignition signal, so as to further drive the propellant to burn; a first buffering pad, laid on the bottom of the inner air chamber; a second buffering pad, correspondingly disposed in the inner air chamber to separate the space for filling the propellant; and a diffuser, correspondingly sheathed and fixed at the main casing, and a space being formed between the diffuser and the main casing for solidifying and depositing a solid residue after the propellant is burned, and the diffuser having a plurality of exhaust holes formed thereon.

Wherein, the igniter group includes an ignition base, an airtight hood, an igniter and an indicator, and the ignition base being fixed to the ignition hole. Wherein, the airtight hood is correspondingly covered onto the ignition base, and the igniter is correspondingly disposed in the ignition base and the airtight hood, for producing an ignition airflow after receiving an ignition signal. Wherein, the indicator is correspondingly disposed onto the airtight hood for guiding the ignition airflow produced by the igniter towards the propellant.

Wherein, the indicator is a hollow casing has a guide hole penetrated through a wall of the indicator. Wherein, the airtight hood is fixed to the ignition base by a welding, and the ignition base is fixed to the ignition hole by the welding. Wherein, the rupture disc includes a seal cover and a membrane, and the seal cover is fixed to an upper end of the central channel and has a port, and the membrane is correspondingly fixed onto the port of the seal cover by the welding, and the membrane may be damaged from an inner side by a pushing force of a certain degree.

Wherein, the first buffering pad and the second buffering pad are ceramic fiber pads, crotch pads or thermal rubber pad, and the propellant is a nonazide gas generant. Wherein, the second buffering pad is a metal crotch pad. Wherein, the exhaust holes are disposed uniformly at the periphery of the diffuser, and the diffuser has a fixed portion disposed thereon, and the fixed portion is comprised of at least one locking hole. Wherein, a recessed portion is disposed at the top wall of the upper housing for providing a buffering effect during inflation. Wherein, the bottom housing is a half cross-sectional casing. Wherein, the upper housing, the bottom housing and the diffuser are fixed by the welding.

The hybrid inflator of an airbag in accordance with the present invention may change the installation mode of the traditional safety airbag inflator by using a structural design substantially in a disc shape, so that the inflator may be embedded into the steering wheel of an automobile and applied in a safety airbag in a narrow space in front of a passenger seat. The invention provides an application with convenience and practicality. Since the inner air chamber is not in a direct contact with the bottom housing and the upper housing and is protected by the cushion ring and the cup cover, therefore a protection of the propellant is provided to avoid the danger of igniting the gas accidentally during the welding process. In addition, an aluminum foil sticker is attached onto the wall of the vent tube for preventing the solder slag produced by the welding process from being injected into the vent tube to provide a double-protection effect and a high safety specification for the manufacturing process.

The technical characteristics of the present invention will become apparent with the detailed description of the preferred embodiments accompanied with the illustration of related drawings as follows. It is noteworthy that same numerals are used for representing the same respective elements in the drawings, and the drawings are provided for the purpose of illustrating the invention, but not intended for limiting the scope of the invention.

DESCRIPTION OF THE PREFERRED EMBODIMENTS

For the benefit of understanding the technical characteristics, contents and advantages of the present invention, the present invention is described in detail by the following examples and drawings. The drawings attached herein are only used to illustrate and accessorily explain the principle of the present invention, not to show the real configurations and ratios of the elements or devices according to the present invention. Therefore, the scope of the claimed invention should not be limited to the ratios and configurations of the devices/elements in the embodiments and drawings below.

With reference to FIGS. 1 to 6, in which a hybrid inflator of an airbag in accordance with a preferred embodiment of the present invention are illustrated, the hybrid inflator comprises a main casing 10, a central channel 20, a vent tube 30, a rupture disc 40, an inner cover group 50, an igniter group 60, a first buffering pad 70, a second buffering pad 80 and a diffuser 90.

The main casing 10 comprises a bottom housing 11 and an upper housing 12, wherein the bottom housing 11 may be a half-casing with a circular cross-section and a space enclosed therein, and an ignition hole 111 is formed and penetrated through a bottom wall of the bottom housing 11 and at a position other then the center of the bottom wall. Wherein, the upper housing 12 has a shape corresponding to the shape of the bottom housing 11, and the upper housing 12 is correspondingly fixed to the top of the bottom housing 11 and the upper housing 12 and the upper housing and the bottom housing 11 are enclosed to form a completely sealed casing. A recessed portion 121 is disposed at the top wall of the upper housing 12 for providing a buffering effect during inflation, or radiating recessed channels may be disposed on the top wall of the upper housing 12 to share the stress of the structure and achieve the effects of enhancing the structural strength and overcoming the deformation issue caused by a too-large stress of gas pressure during the inflation process. In addition, the present invention may achieve the gas channel effect during the gas discharge process to facilitate the flowing of the gas. In addition, a through opening 122 is formed and penetrated through the top end of the upper housing 12, and the upper housing 12 and the bottom housing 11 may be fixed by a laser welding.

The aforementioned central channel 20 is a pipe member with a hollow formed therein and an opening formed at the upper end of the pipe member, and the bottom of the pipe member is correspondingly fixed to the bottom housing 11 by a friction welding. The upper end of the pipe member is correspondingly passed through the through opening 122. The upper end of the pipe member and the upper housing 12 are fixed by the laser welding to improve the support force between the bottom housing 11 and the upper housing 12. The central channel 20 has a plurality of convective holes 21 formed on a wall of the central channel 20.

The aforementioned vent tube 30 is correspondingly sheathed on the external side of the central channel 20, or an aluminum foil sticker may be attached onto an external surface of the vent tube 30. The vent tube 30 has a plurality of throttle holes 31 formed thereon, and the throttle holes 31 are not aligned evenly with the convective holes 21 on the wall of the central channel 20 to achieve the throttle effect when the burning gas flows from the vent tube 30 into the central channel 20 to filter the slag of the burned gas. In addition, the quantity and diameter of the throttle holes 31 may be adjusted to control the burning time and adjust the output air pressure.

The aforementioned rupture disc 40 is correspondingly sealed and disposed onto an upper end of the central channel 20 by a resistance welding to prevent the gas in the main casing 10 from flowing out, and may be opened from an inner side by a pushing force of a certain degree. The rupture disc 40 includes a seal cover 41 and a membrane 42, and the seal cover 41 is fixed to the upper end of the central channel 20 and has a port formed thereon. The membrane 42 is correspondingly fixed to the port of the seal cover 41 by a welding, wherein the welding method may be a resistance welding method, but the invention is not limited to this method only. The rupture disc 40 may be damaged from an inner side by a pushing force of a certain degree.

The aforementioned inner cover group 50 includes a cushion ring 51, a cup cover 52 and a support plate 53, wherein the cushion ring 51 is correspondingly disposed on an internal circular wall of the bottom housing 11. The cup cover 52 has a shape corresponding to the shape of the cushion ring 51 and covered and fixed onto the top of the cup cover 52, and the cup cover 52 and the bottom housing 11 are enclosed to form an inner air chamber, and the inner air chamber has a propellant A or a nonazide gas generant installed therein, and a sheath opening 521 is formed and penetrated through the cup cover 52 and correspondingly sheathed on the central channel 20. Wherein, the support plate 53 is correspondingly disposed onto the cup cover 52, or fixed to the cup cover 52 by the resistance welding and abutted against the cup cover 52 and the upper housing 12 to provide a support force in order to prevent shaking the interior by vibration.

The aforementioned igniter group 60 is correspondingly fixed into the ignition hole 111 corresponding to the inner air chamber, or fixed by the welding such as a laser welding method, but the invention is not limited to such method only. The igniter group 60 includes an ignition base 61, an airtight hood 62, an igniter 63 and an indicator 64, wherein the ignition base 61 is fixed onto the ignition hole 111, and the airtight hood 62 is correspondingly covered onto the ignition base 61 or fixed by the welding method. The igniter 63 is correspondingly disposed in the ignition base 61 and the airtight hood 62 for producing an ignition airflow after receiving an ignition signal in order to further drive the propellant A to burn and produce a high-temperature gas. The gas is combined with the room-temperature gas originally existed therein to form a mixed high pressure gas with an appropriate temperature in order to pierce through the rupture disc 40. Wherein, the indicator 64 is correspondingly disposed on the airtight hood 62 to guide the ignition flow produced by the igniter 63 towards the propellant A, and the indicator 64 may be a hollow casing and has a guide hole 641 formed and penetrated through a wall of the indicator 64.

The aforementioned first buffering pad 70 is laid on the bottom of the inner air chamber for disposing the propellant A thereon, wherein the first buffering pad 70 may be a ceramic fiber pad, a crotch pad or a thermal rubber pad.

Figure 1:
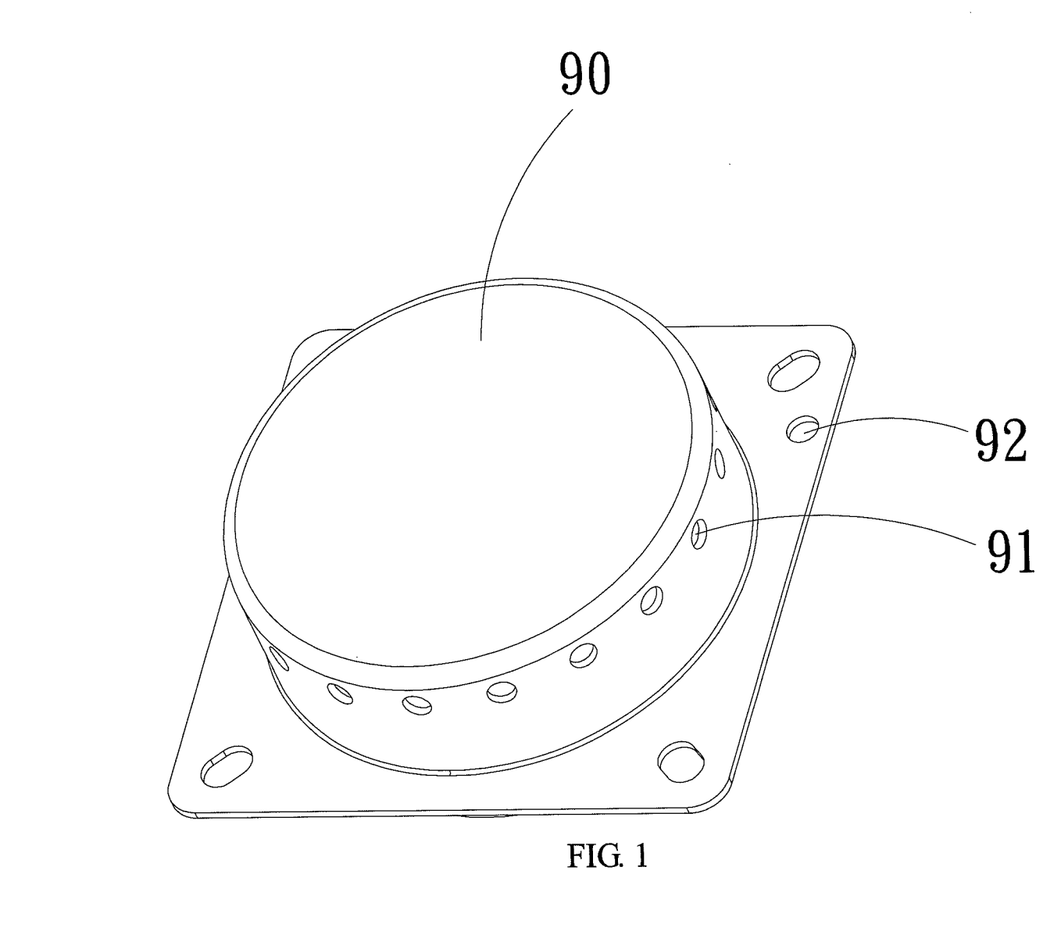
FIG. 1 is a perspective view of a hybrid inflator of an airbag in accordance with the present invention.
Figure 2:
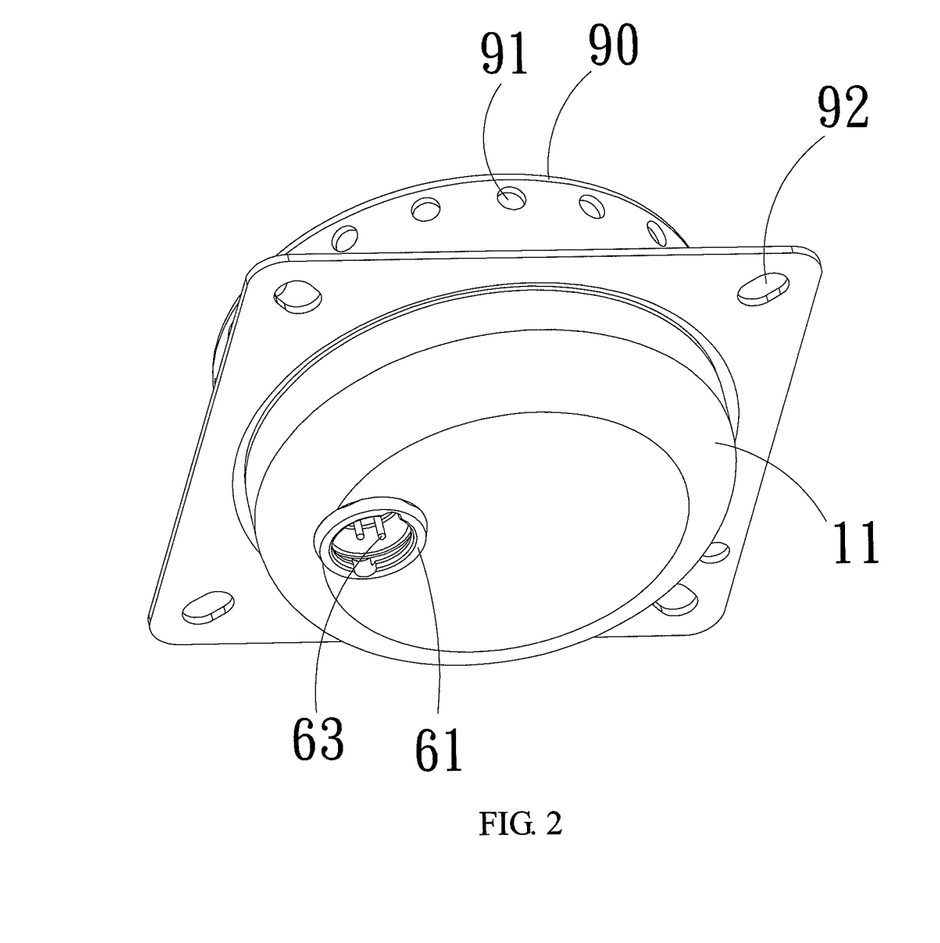
FIG. 2 is a perspective view of a hybrid inflator of an airbag in accordance with the present invention, viewing from another angle.
Figure 3:
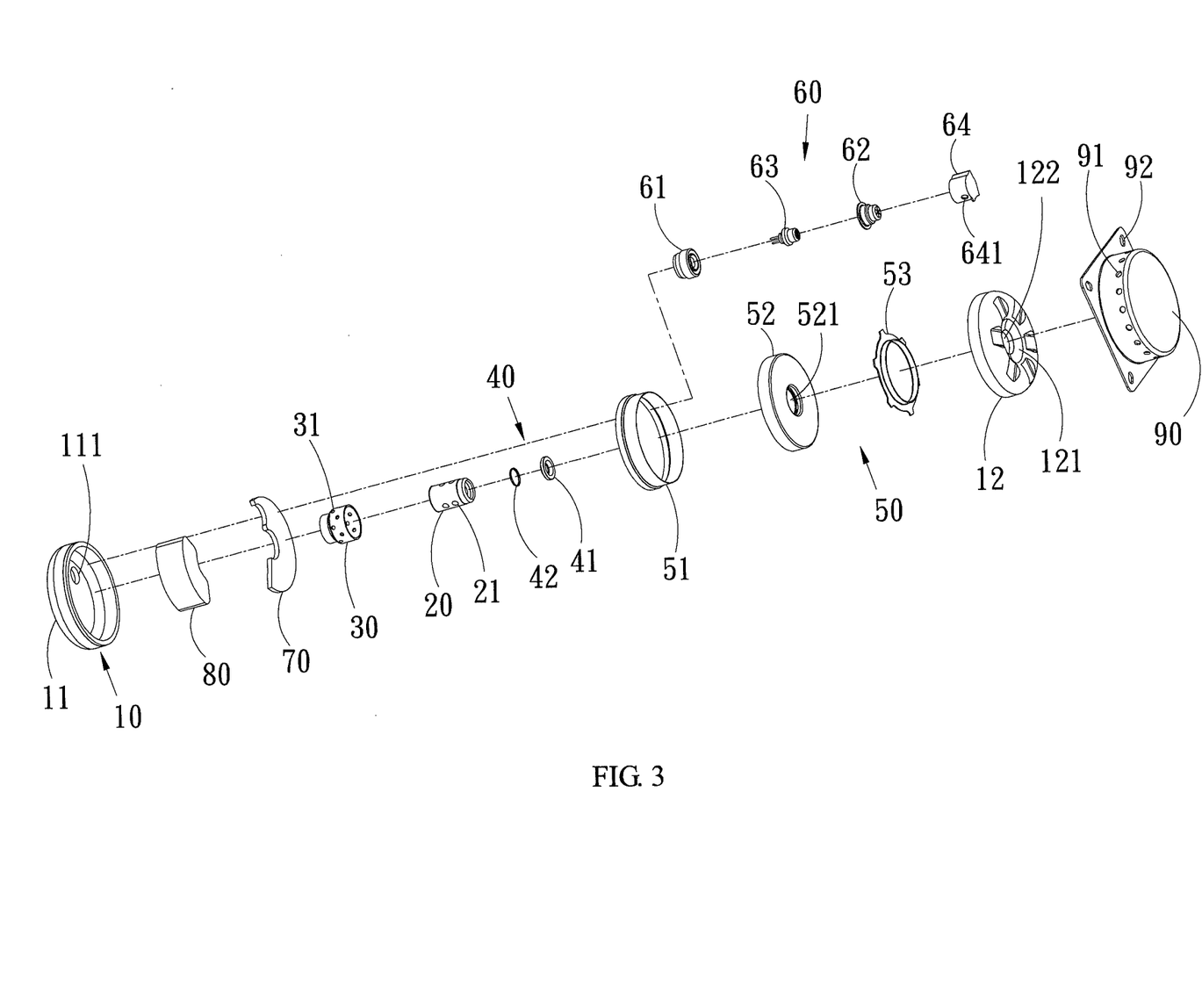
FIG. 3 is an exploded view of a hybrid inflator of an airbag in accordance with the present invention.
Figure 4:
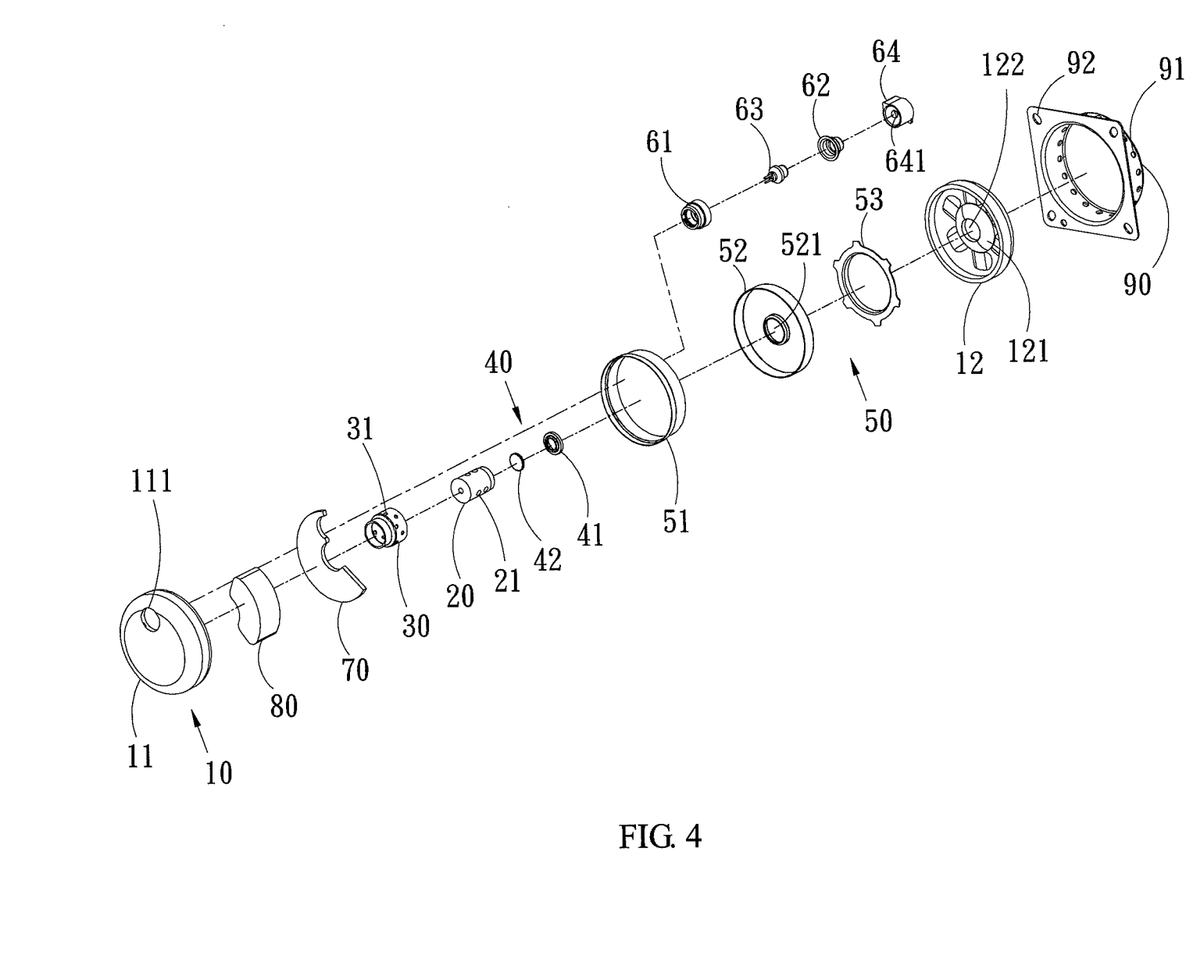
FIG. 4 is an exploded view of a hybrid inflator of an airbag in accordance with the present invention, viewing from another angle.
Figure 5:
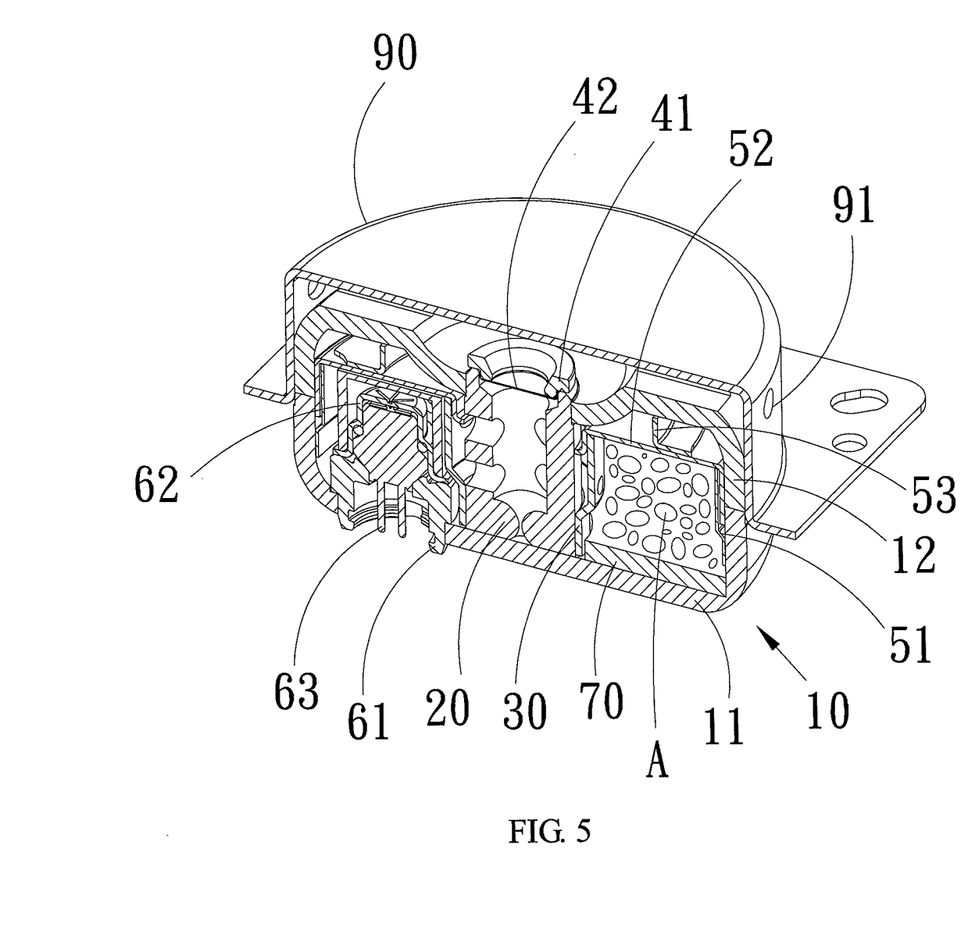
FIG. 5 is a cross-sectional view of a hybrid inflator of an airbag in accordance with the present invention.
Figure 6:
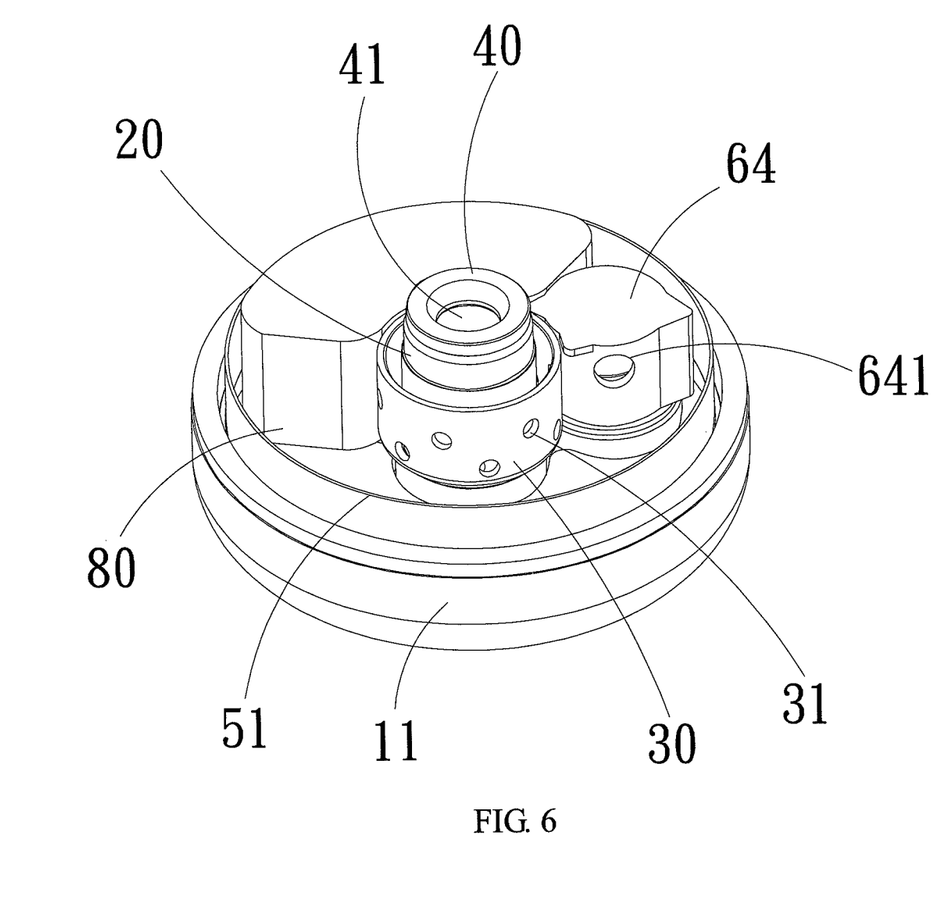
FIG. 6 is a first perspective view of some components of a hybrid inflator of an airbag in accordance with the present invention.
Figure 7:
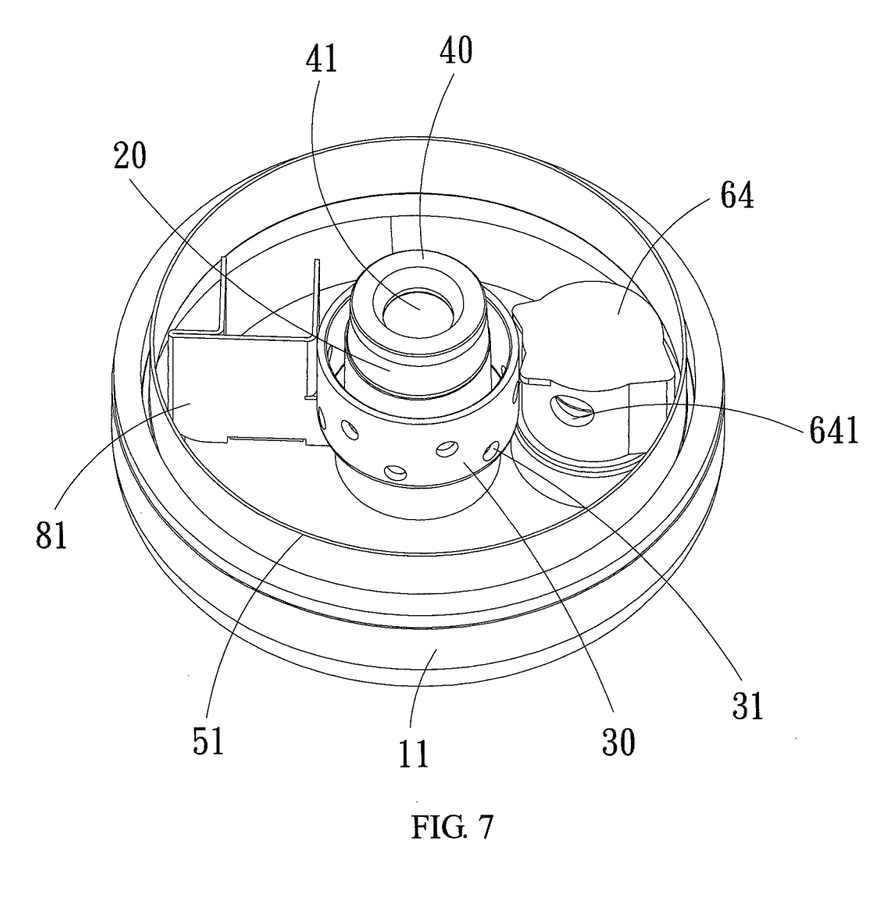
FIG. 7 is a second perspective view of some components of a hybrid inflator of an airbag in accordance with the present invention.

The aforementioned second buffering pad 80 is correspondingly disposed in the inner air chamber to separate the space for filling the propellant A, and the volume and size of the second buffering pad 80 may be changed to control the capacity of the propellant A of the inner air chamber while providing the shock absorption effect to prevent the propellant A from being cracked or broken by vibration, wherein the second buffering pad 80 may be a ceramic fiber pad, a crotch pad or a thermal rubber pad. Further, the second buffering pad 80 may be a metal partition 81, as show in FIG. 7.

The aforementioned diffuser 90 is correspondingly sheathed on the main casing 10 or fixed onto the main casing 10 by the welding such as the laser welding method, but the invention is not limited to such method only. A space is formed between the diffuser 90 and the main casing 10 and provided for solidifying and depositing a solid residue produced after the burning of the propellant A. The diffuser 90 has a plurality of exhaust holes 91 formed thereon or distributed uniformly at the periphery of the diffuser 90 for uniformly releasing the of the rupture disc 40 outward from the exhaust holes 91 in order to inflate the safety airbag. The diffuser 90 further includes a filter net for filtering the solid residue produced after the burning to reduce the amount of residues discharged into the airbag. In addition, the diffuser 90 has a fixed portion 92, and the fixed portion 92 may be comprised of at least one locking hole for correspondingly locking a retaining tray of the safety airbag.

With the skilful design of the hybrid inflator of an airbag in accordance with the present invention, the structural design substantially in a disc shape, so that the inflator may be embedded into the steering wheel of an automobile and applied in a safety airbag in a narrow space in front of a passenger seat. The invention provides an application with convenience and practicality. Since the inner air chamber is not in a direct contact with the bottom housing 11 and the upper housing 12 and is protected by the cushion ring 51 and the cup cover 52, therefore a protection of the propellant A is provided to avoid the danger of igniting the gas accidentally during the welding process. In addition, an aluminum foil sticker is attached onto the wall of the vent tube 30 for preventing the solder slag produced by the welding process from being injected into the vent tube 30 to provide a double-protection effect and a high safety specification for the manufacturing process. Obviously, the invention improves over the prior art.

While the invention has been described by means of specific embodiments, numerous modifications and variations could be made thereto by those skilled in the art without departing from the scope and spirit of the invention set forth in the claims.

What is claimed is:

1. A hybrid inflator of an airbag, comprising:

a main casing, comprising a bottom housing and an upper housing, and the bottom housing having an ignition hole formed on a bottom wall of the bottom housing, and the upper housing being correspondingly fixed at the top of the bottom housing and the upper housing together with the bottom housing forming a complete sealed casing, and a through opening penetrated through a top end wall of the upper housing;

a central channel, having a pipe member with a hollow therein and an opening formed at an upper end of the pipe member, and a bottom of the pipe member being correspondingly fixed onto the bottom housing, and the upper end of the pipe member correspondingly passing through the through opening for fixing the upper housing, and a plurality of convective holes being formed on a wall of the central channel;

a vent tube, correspondingly sheathed on an external side of the central channel, and having an aluminum foil sticker attached onto an external surface of the vent tube, and a plurality of throttle holes penetrated through the vent tube;

a rupture disc, correspondingly sealed and disposed at an upper end of the central channel for preventing a gas outflow from the main casing, and openable from an inner side by a pushing force of a certain degree;

an inner cover group, comprising a cushion ring, a cup cover and a support plate, and the cushion ring being correspondingly disposed on an internal circular wall of the bottom housing, and the cup cover having a shape corresponding to a shape of the cushion ring and covered and fixed to a top of the cushion ring and the cup cover and the cup cover and the bottom housing being enclosed into an inner air chamber, and a propellant being disposed in the inner air chamber, and a sheath opening penetrated through the cup cover and correspondingly sheathed on the central channel, and the support plate being correspondingly disposed on the cup cover and abutted between the cup cover and the upper housing;

an igniter group, correspondingly fixed to the ignition hole corresponding to the inner air chamber, for producing an ignition airflow after receiving an ignition signal, so as to further drive the propellant to burn;

a first buffering pad, laid on the bottom of the inner air chamber;

a second buffering pad, correspondingly disposed in the inner air chamber to separate the space for filling the propellant; and a diffuser, correspondingly sheathed and fixed at the main casing, and a space being formed between the diffuser and the main casing for solidifying and depositing a solid residue after the propellant is burned, and the diffuser having a plurality of exhaust holes formed thereon.

2. The hybrid inflator of the airbag according to claim 1, wherein the igniter group comprises an ignition base, an airtight hood, an igniter and a indicator, and the ignition base is fixed to the ignition hole, and the airtight hood being correspondingly covered onto the ignition base, and the igniter is correspondingly disposed in the ignition base and the airtight hood, for producing an ignition airflow after receiving an ignition signal, and the indicator are correspondingly disposed onto the airtight hood for guiding the ignition airflow produced by the igniter towards the propellant.

3. The hybrid inflator of the airbag according to claim 2, wherein the indicator is a hollow casing has a guide hole penetrated through a wall of the indicator.

4. The hybrid inflator of the airbag according to claim 2, wherein the airtight hood is fixed to the ignition base by a welding, and the ignition base is fixed to the ignition hole by the welding.

5. The hybrid inflator of the airbag according to claim 2, wherein the first buffering pad and the second buffering pad are ceramic fiber pads, crotch pads or thermal rubber pad, and the propellant is a nonazide gas generant.

6. The hybrid inflator of the airbag according to claim 5, wherein the second buffering pad is a metal partition.

7. The hybrid inflator of the airbag according to claim 2, wherein the rupture disc comprises a seal cover and a membrane, and the seal cover is fixed to the upper end of the central channel and has a port, and the membrane is correspondingly fixed onto the port of the seal cover by a welding, and the membrane is damaged from an inner side by a pushing force of a certain degree.

8. The hybrid inflator of the airbag according to claim 7, wherein the upper housing has a recessed portion disposed at the top wall of the upper housing for providing a buffering effect during inflation, and the recessed portion comprises a plurality of recessed channels.

9. The hybrid inflator of the airbag according to claim 7, wherein the throttle holes are not aligned evenly with the convective holes on the wall of the central channel.

10. The hybrid inflator of the airbag according to claim 7, wherein the exhaust holes are disposed uniformly at the periphery of the diffuser, and the diffuser has a fixed portion disposed thereon, and the fixed portion is comprised of at least one locking hole.

11. The hybrid inflator of the airbag according to claim 7 wherein the upper housing, the bottom housing and the diffuser are fixed by the welding.

12. The hybrid inflator of the airbag according to claim 7, wherein the diffuser further comprises a filter.

* * * * *